(12) United States Patent
Gonçalves Da Rosa

(10) Patent No.: US 10,886,813 B2
(45) Date of Patent: Jan. 5, 2021

(54) HARDWEARING BASE FOR ROTATING ELECTRIC MACHINES AND CORRESPONDING ELECTRIC MACHINE

(71) Applicant: WEG EQUIPAMENTOS ELETRICOS S.A., Jaraguá do Sul (BR)

(72) Inventor: Joel Gonçalves Da Rosa, Jaragua do Sul (BR)

(73) Assignee: WEG EQUIPAMENTOS ELETRICOS S.A., Jaraguá do Sul (BR)

( * ) Notice: Subject to any disclaimer, the term of this patent is extended or adjusted under 35 U.S.C. 154(b) by 24 days.

(21) Appl. No.: 16/472,607

(22) PCT Filed: Dec. 23, 2016

(86) PCT No.: PCT/BR2016/050347
§ 371 (c)(1),
(2) Date: Jun. 21, 2019

(87) PCT Pub. No.: WO2018/112569
PCT Pub. Date: Jun. 28, 2018

(65) Prior Publication Data
US 2019/0386536 A1    Dec. 19, 2019

(51) Int. Cl.
*H02K 5/173* (2006.01)
*H02K 5/24* (2006.01)
*F16C 17/02* (2006.01)

(52) U.S. Cl.
CPC .......... *H02K 5/1732* (2013.01); *F16C 17/02* (2013.01); *F16C 2380/26* (2013.01); *H02K 5/24* (2013.01)

(58) Field of Classification Search
CPC .............................. H02K 5/1732; H02K 5/24
(Continued)

(56) References Cited

U.S. PATENT DOCUMENTS

| 2,209,477 A | 7/1940 | Reibel |
| 2,803,416 A | 8/1957 | Berlien |

(Continued)

OTHER PUBLICATIONS

International Search Report for International Application No. PCT/BR2016/050347 dated Feb. 22, 2017, 2 pages.

*Primary Examiner* — Thomas Truong
(74) *Attorney, Agent, or Firm* — Knobbe, Martens, Olson & Bear LLP

(57) ABSTRACT

The present invention relates to a hardwearing base (100) for rotating electric machines that has a cradle (110), bearings (200), covers (300), brackets (400) and fastening elements (500), the cradle (110) having a base (111) and a pair of flanges (120) arranged in a plane perpendicular to the base. Each of the flanges (120) of the hardwearing base (100) has a semicircular opening (122) that has a central protrusion (130) formed by a tooth that is flanked by oblong cutouts (134) and has a concave upper portion (131), inclined sides (132), inclined transition sides (133) between the upper concave portion (131) and the inclined sides (132), and two upper enlargements (140), each having an outward protrusion (141) and an inward protrusion (142) adjacent to an oblong cutout (143), in which the apex of the inward protrusion (142) extends beyond the curve of the semicircular opening (122) by a distance equal to the depth of the smaller side of the oblong cutout (143).

10 Claims, 2 Drawing Sheets

(58) Field of Classification Search
USPC .......................................... 310/89, 90, 91, 51
See application file for complete search history.

(56) References Cited

U.S. PATENT DOCUMENTS

| | | |
|---|---|---|
| 2,810,536 A | 10/1957 | Cunningham |
| 3,516,627 A | 6/1970 | Gable et al. |
| 8,421,290 B2 | 4/2013 | Lin |
| 8,987,960 B2 | 3/2015 | Li et al. |
| 2014/0062268 A1* | 3/2014 | Li .......................... H02K 5/24 310/68 R |

* cited by examiner

Detail A (1:3)

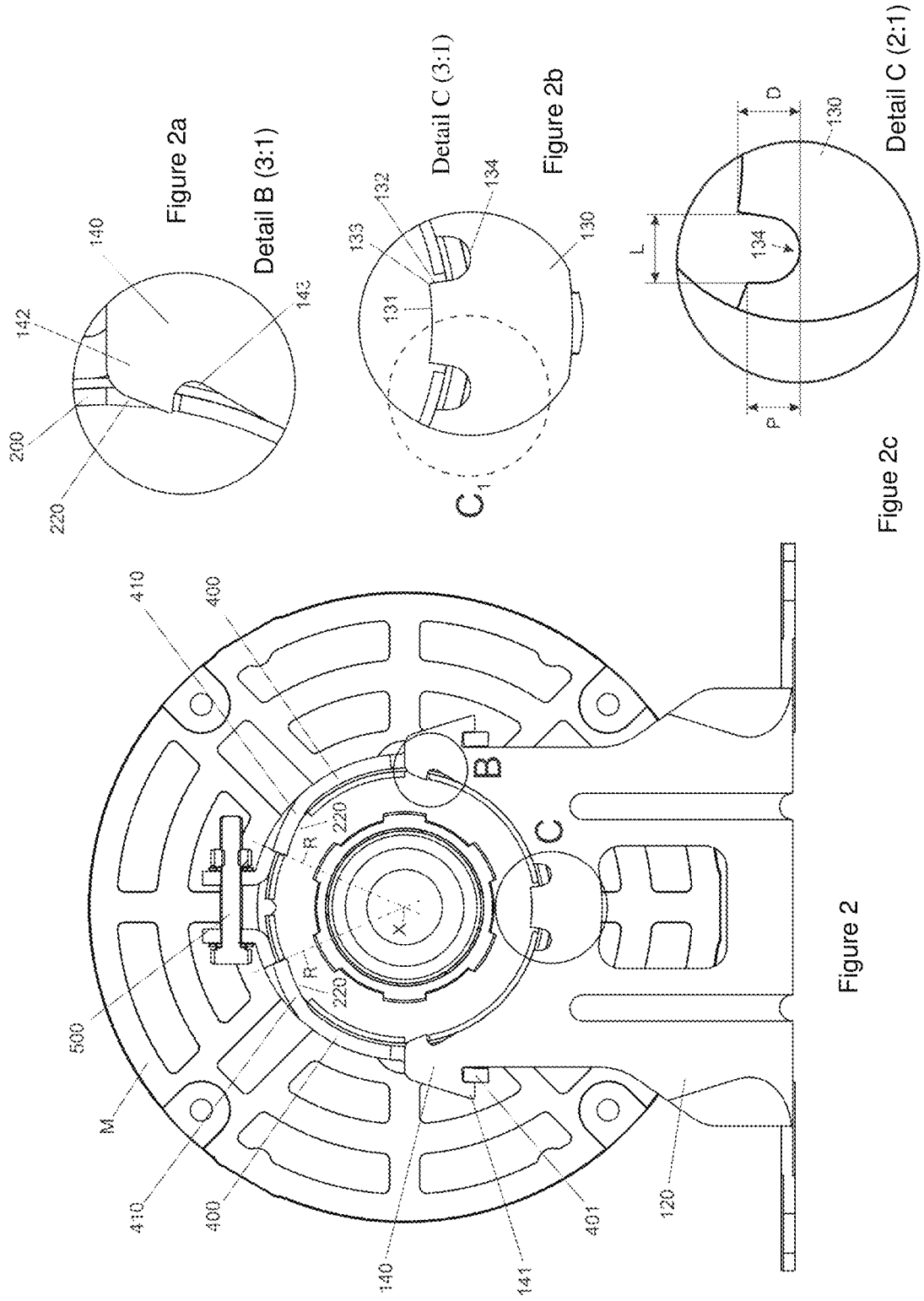

HARDWEARING BASE FOR ROTATING ELECTRIC MACHINES AND CORRESPONDING ELECTRIC MACHINE

FIELD OF THE INVENTION

The present invention relates to a hardwearing base for support and fastening of rotating electric machines.

BACKGROUND OF THE INVENTION

The vibration on a rotating electric machine is closely related to its installation conditions. Rotating electric machines with roller bushings are extremely sensitive to vibrations and may suffer premature wear if subjected to vibrations surpassing the standardized thresholds.

For this reason, it is extremely important for rotating electrical machines operating in other than usual or extreme situations and/or positions, to have a mechanical base (support and fastening) with adequate dimensional tolerances and stiffness, so as to prevent damage to the equipment, ensure the integrity of the components and maintain vibration levels within appropriate thresholds.

Hardwearing bases specifically help with support and fastening of rotating electrical machines so that they can be used in special applications, such as in exhaust systems and/or mounted in vertical position and/or coupled to elements with non-optimal balancing operations and/or with cyclical unbalancing etc.

The purpose of these hardwearing bases therefore is supporting and fastening the rotating electric machine even in positions of vertical application and in order to absorb and minimize the vibrations transmitted thereto by the application interfaces, being able to endure the operation conditions and remain intact during the entire lifespan of the machine.

In addition, a hardwearing base of the above described nature should not interfere with the thermal dissipation of either the electric machine or the application and, eventually, actively participate in the heat exchange of the assembly.

DESCRIPTION OF THE RELATED ART

Hardwearing bases basically have a central structure or cradle in which at least one pair of bushings or bearings for fastening the rotating shaft of the electric machine and an assembly of locking elements of the bearings in the cradle are secured.

Several solutions for hardwearing bases of rotating electrical machines are known from the state of the art, an example being the support structure and thermal dissipation for electric motors described by the patent document U.S. Pat. No. 8,987,960. This document reveals a support and thermal dissipation structure for motors equipped with driver, in which the structure, among other features, is equipped with a cradle having longitudinal reinforcements and includes a protrusion at each end for the axial locking of the bearings in the cradle. Radial locking, in turn, is performed by elastic straps fastened to lateral protrusions of the ends of the cradle, tightened and continuously tensioned, each with a screw and a spring.

It is noteworthy that the structure proposed by U.S. Pat. No. 8,987,960, in particular its cradle, failed to provide a protrusion for axial locking with reduced size in relation to the diameter of the bearings, creating a zone of excessive mechanical tension concentration, mostly on the smaller sides of the protrusion, not very effective for larger electric motors arranged, for example, in vertical applications, wherein axial load on the bearings is increased. Additionally, the radial fixation made by the straps limits the possible torque for the application and, eventually, the motor size and/or its position, since it depends solely on the friction between the strap and the bearing.

Similar issues are found in the solutions described by the patent documents U.S. Pat. Nos. 8,421,290 and 2,209,477.

Another solution in the state of the art is the one revealed by patent document U.S. Pat. No. 2,803,416, which describes a hardwearing base in which, among other features, the bearings are fastened by metal straps having a triangular protrusion on their internal face for radial locking of the bearing. The disadvantage here lies precisely in the shape of the protrusion and the fact that it is only a triangular wedge to assist the strap in the axial locking of the motor bearing, absorbing the forces in a parallel plane.

Other solutions proposed by the state of the art deal with conjugated mechanisms that, nonetheless present the same aforementioned issues, also having a high risk of dismantling of the bearing in relation to the cradle, as well as excessive flexing in the support flaps which results in dropping of the motor and rotation of the rotor within the base.

As can be inferred from the above description, there is space and demand for a hardwearing base which solves the issues in the state of the art, providing a structure that is robust and reliable, capable of ensuring both the axial locking and the radial locking of the rotating electric machine with support and fastening, even in extreme actuating/operating conditions.

SUMMARY OF THE INVENTION

One of the objectives of the present invention is to provide a hardwearing base according to features of claim 1 from the appended set of claims.

Another objective of the present invention is to provide a rotating electric machine according to the features of claim 6 of the appended the set of claims.

Other features and details of the features are represented by dependent claims.

BRIEF DESCRIPTION OF THE DRAWINGS

For better understanding and visualization of the present invention's object, it will now be described with reference to the attached drawings, representing the technical effect obtained via an exemplary embodiment not limiting the scope of the present invention, in that, schematically:

FIG. 2: shows an enlarged partial view of a hardwearing base according to the invention;

FIG. 2a: shows an enlarged detail of FIG. 2;

FIG. 2b: shows an enlarged detail of FIG. 2; and

FIG. 2c: shows an enlarged detail of FIG. 2.

DETAILED DESCRIPTION OF THE PREFERRED EMBODIMENT

Figure 1A:
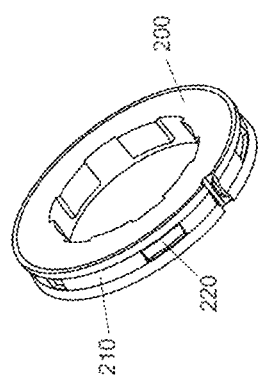
FIG. 1a: shows a detailed view of a bearing according to the invention.
Figure 1B:
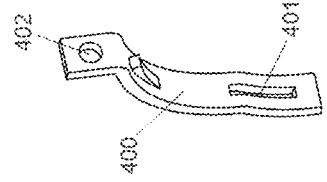
FIG. 1b: shows a detailed view of a bracket according to the invention.
Figure 1C:
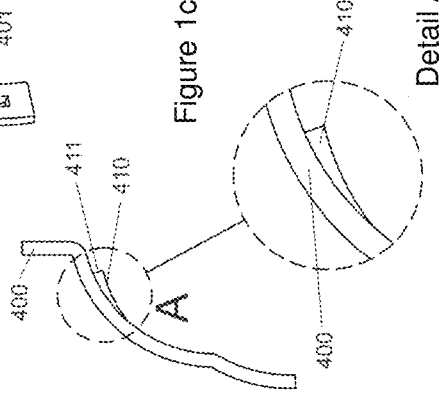
FIG. 1c: shows an enlarged detail of FIG. 1b.
Figure 1:
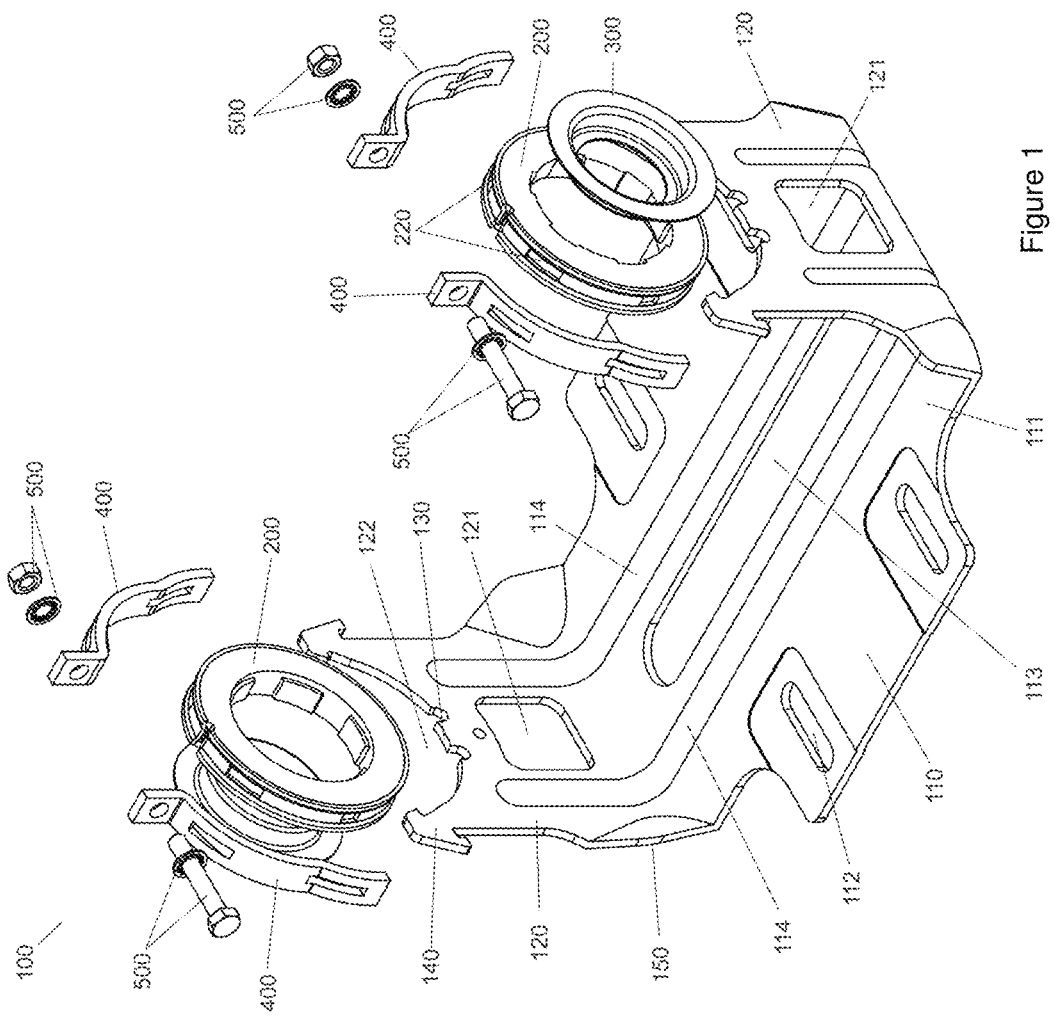
FIG. 1: shows an exploded perspective view of a hardwearing base according to the invention.

The present invention relates to a hardwearing base (100) having a cradle (110), bearings (200), covers (300), brackets (400) and fastening elements (500).

The cradle (110) is formed so as to include a lower portion, or base (111) and a pair of flanges (120) arranged in a plane perpendicular to the base.

The base (111) has external apertures (112) for fastening on a substrate (not shown), a cutout opening (113) for thermal dissipation and mass optimization, and a pair of longitudinal reinforcements (114) to decrease flexing on the flanges (120) and torsion on the base (111), in which the longitudinal reinforcements (114) extend up to a portion of the height of each of the flanges (120).

In the perimeter zone of transition between the base (111) and the flanges (120), there are side reinforcements (150) in each side to decrease the flexing and torsion of the flanges (120) in relation to the base (111).

Each of the flanges (120) has a cutout opening (121) for thermal dissipation and mass optimization and a semicircular opening (122) to receive the bearing (200).

The semicircular opening (122) of each of the flanges (120) has a central perimeter portion equipped with a central protrusion (130) for axial locking of the bearing (200), this central protrusion (130) being formed by a tooth equipped with a concave upper portion (131) and inclined sides (132), with inclined transition sides (133) between the upper concave portion (131) and the inclined sides (132).

Each of the inclined sides (132) ends in an oblong cutout (134), the depth (P) of each oblong cutout (134) being equivalent to a measure between 65% and 90%, preferably 75% of the distance (D) between the minimum point of curvature of the oblong cutout (134) and the top of the upper concave portion (131).

The width (L) of the opening of the oblong cutout (134), that is, the distance between the inclined side (132) and the apex of the opposite end of the oblong cutout (134) is also equivalent to a measure between 65% and 95%, preferably 75% of the distance (D) between the maximum point of curvature of the oblong cutout (134) and the top height of the concave upper portion (131).

Thus, a central protrusion (130) is obtained, with dimensions suitable to support the axial forces that act upon the bearing (200) with an optimal distribution of tension and thus increase of the axial resistance of the hardwearing base (100) according to the invention in relation to the similar ones in the state of the art.

The semicircular opening (122) of each of the flanges (120) is equipped with a medial perimeter portion having an upper enlargement (140), with an outward protrusion (141) so as to receive one of the ends of the bracket (400) and an inward protrusion (142) adjacent to an oblong cutout (143), in which the apex of the inward protrusion (142) extends beyond the curve of the semicircular opening (122) by a distance equal to the depth of the smaller side of the oblong cutout (143).

Thus, an upper widening (140) is obtained, equipped with an external protrusion (141) capable of adequately supporting the axial and radial forces and an internal protrusion (142) capable of assisting the brackets (400) to suitably support the axial and radial forces that act upon the bearing (200), both protrusions (141, 142) with an optimal distribution of tension and thus increase of the axial resistance of the hardwearing base (100) according to the invention in relation to the similar ones in the state of the art.

Each bearing (200) has a radial channel (210) lowered in relation to the external diameter of the bearing (200), openings (220) being disposed at the bottom of the radial channel (210).

Each bracket (400) has an end with an opening (401) for engagement into the external protrusion (141) and at the opposite end an aperture (402) for the passage of the fastening elements (500).

Each bracket (400) between these ends, has in its inside or part facing the bearing (200), a protrusion (410), the perpendicular face (411) of which being in a plane parallel to a radial line (R) of the center (X) of the motor shaft (M), in that this perpendicular face (411) abuts one of the walls of one of the openings (220), thus promoting radial locking of the bearing (200). Since the brackets (400) are arranged opposed to each other, each perpendicular face (411) locking the bearing (200) radially against rotation in one of the two possible rotating directions.

The same occurs with each of the internal protrusions (142) engaging and abutting one of the walls of one of the openings (220), promoting radial locking of the bearing (200). Since the internal protrusions (142) are arranged opposed to each other, locking occurs in relation to the two possible rotating directions.

The fastening elements (500) may be, but are not limited to bolts and/or nuts and/or clamps and/or latches and/or wedges, in short, any suitable and known fastening element (500) of the state of the art.

Final Considerations

It is clear that the measurements and relationships between measures described for the present invention are exemplary and may vary according to the dimensioning of the electric motor (M).

Exhaustive practical tests, however, have shown that these dimensions and their relationships are highly efficient and effective in supporting and fastening electric motors (M), providing excellent operating conditions even under extreme application conditions.

In addition, said measurements and their relationships are highly reliable and reproducible.

Finally, it should be noted that the solution presented can be used in rotating electric machines of varied polarities.

CONCLUSION

It will be easily understood by those skilled in the art that changes can be made to the present invention without departing from the concepts exposed in the above description. These changes must be regarded as included in the scope of the present invention. Consequently, the particular embodiments previously described in detail are only illustrative and exemplary and are non-restrictive as to the scope of the present invention, to which the full extent of the appended set of claims and any and all correspondents thereof should be given.

What is claimed is:

1. A hardwearing base (100) for rotating electric machines having a cradle (110), bearings (200), covers (300), brackets (400) and fastening elements (500), the cradle (110) having a base (111) and a pair of flanges (120) arranged in a plane perpendicular to the base, the hardwearing base (100) being characterized in that each of said flanges (120) has a semicircular opening (122) having
   a. a central protrusion (130) formed by a tooth that is flanked by oblong cutouts (134) and a concave upper portion (131), inclined sides (132), inclined transition sides (133) between the upper concave portion (131) and the inclined sides (132); and
   b. two upper enlargements (140), each having an outward protrusion (141) and an inward protrusion (142) adjacent to an oblong cutout (143), in which an apex of the inward protrusion (142) extends beyond a curve of the semicircular opening (122) by a distance equal to a depth of a smaller side of the oblong cutout (143).

2. The hardwearing base of claim 1, wherein the base (111) and each of said flanges (120) have cutout openings (113, 121).

3. The hardwearing base of claim 1, wherein there are side reinforcements (150) in a perimeter zone of transition between the base (111) and the flanges (120).

4. The hardwearing base of claim 1, wherein each bearing (200) has a radial channel (210), openings (220) being disposed at a bottom thereof.

5. The hardwearing base of claim 1, wherein each bracket (400) has in its inside or portion facing the bearing (200), a protrusion (410), a perpendicular face (411) of which being in a plane parallel to a radial line (R) of a center (X) of a motor shaft (M).

6. An electric machine, comprising:
  a hardwearing base (100) for rotating electric machines having a cradle (110), bearings (200), covers (300), brackets (400) and fastening elements (500), the cradle (110) having a base (111) and a pair of flanges (120) arranged in a plane perpendicular to the base, wherein each of said flanges (120) has a semicircular opening (122) having
    a central protrusion (130) formed by a tooth that is flanked by oblong cutouts (134) and a concave upper portion (131), inclined sides (132), inclined transition sides (133) between the upper concave portion (131) and the inclined sides (132); and
  two upper enlargements (140), each having an outward protrusion (141) and an inward protrusion (142) adjacent to an oblong cutout (143), in which an apex of the inward protrusion (142) extends beyond a curve of the semicircular opening (122) by a distance equal to a depth of a smaller side of the oblong cutout (143).

7. The electric machine of claim 6, wherein the base (111) and each of said flanges (120) have cutout openings (113, 121).

8. The electric machine of claim 6, wherein there are side reinforcements (150) in a perimeter zone of transition between the base (111) and the flanges (120).

9. The electric machine of claim 6, wherein each bearing (200) has a radial channel (210), openings (220) being disposed at a bottom thereof.

10. The electric machine of claim 6, wherein each bracket (400) has in its inside or portion facing the bearing (200), a protrusion (410), a perpendicular face (411) of which being in a plane parallel to a radial line (R) of a center (X) of a motor shaft (M).

* * * * *